Feb. 26, 1952     H. H. COOK     2,587,289
THRESHING MACHINE
Filed Aug. 24, 1945     5 Sheets—Sheet 4
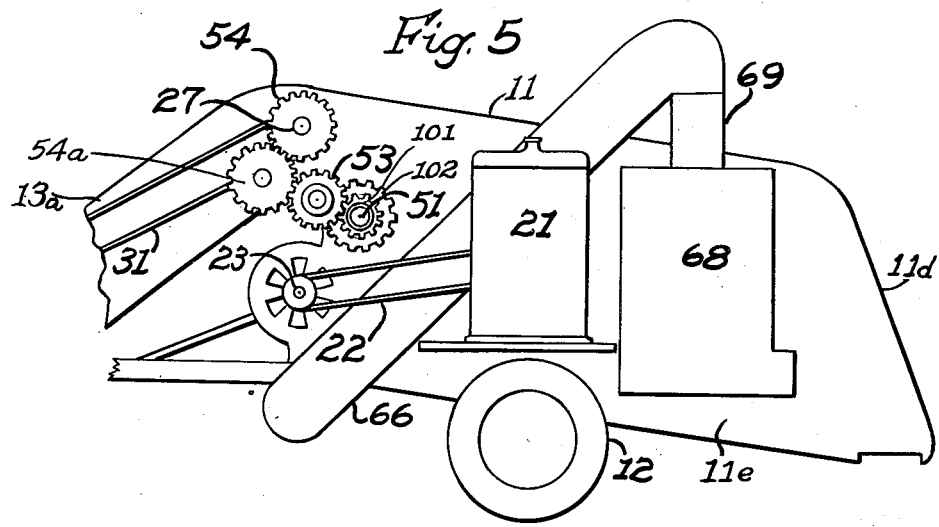
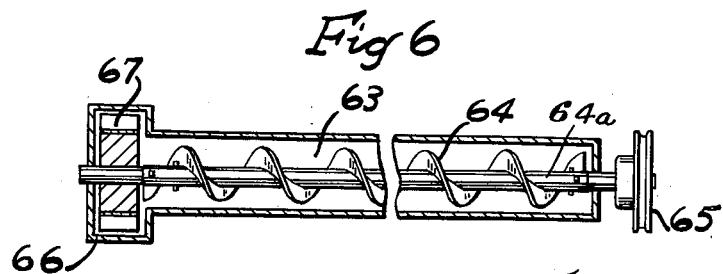
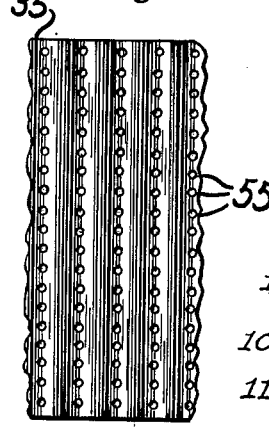
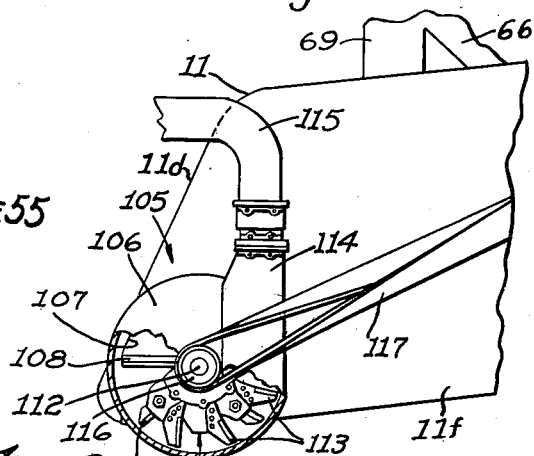
Inventor
Harold H. Cook
By McCanna and Morsbach
Attys Feb. 26, 1952 — H. H. COOK — 2,587,289
THRESHING MACHINE
Filed Aug. 24, 1945 — 5 Sheets-Sheet 5
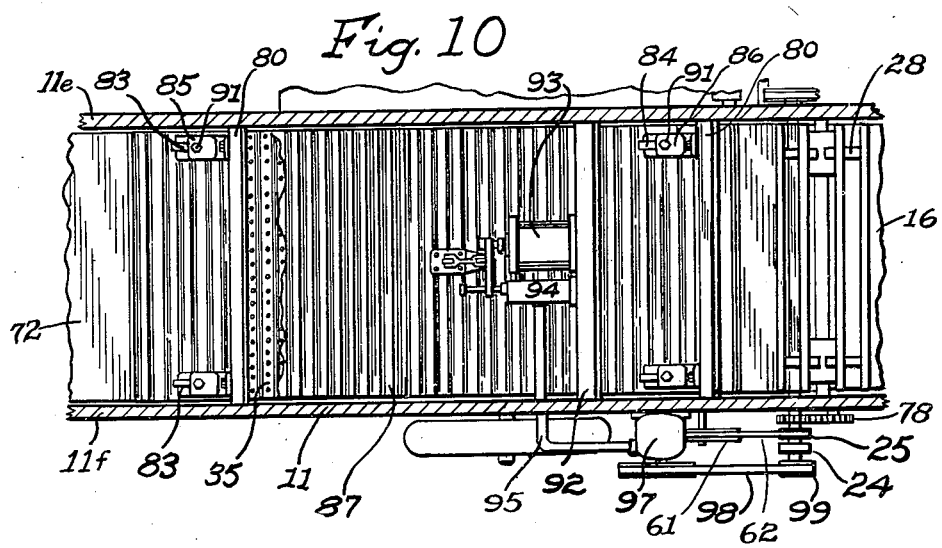
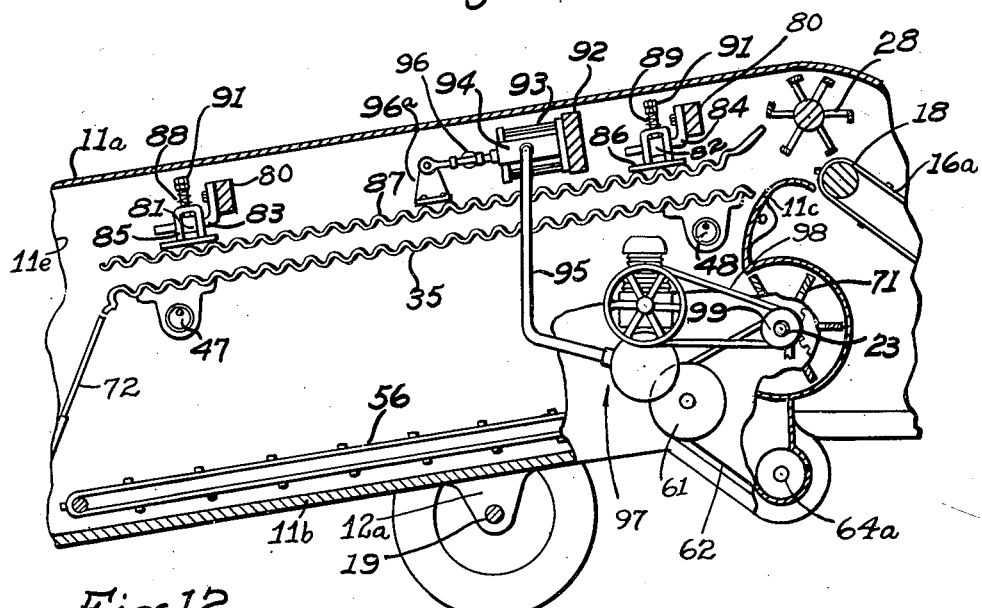
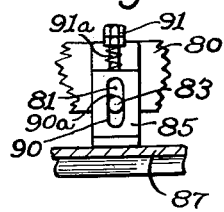
Inventor
Harold H. Cook
By McCanna and Morsbach
Attys Patented Feb. 26, 1952

2,587,289

UNITED STATES PATENT OFFICE 2,587,289

THRESHING MACHINE

Harold H. Cook, Steward, Ill.

Application August 24, 1945, Serial No. 612,429

11 Claims (Cl. 130—30)

This invention relates to a harvesting machine for separating the grain or seed from the stalk upon which it was grown, and relates primarily to a machine suitable for harvesting vine crops such as green peas and beans though it may be used for general harvesting of small grains by suitable adjustment provided for in the machine. The invention also pertains to apparatus and mechanism for collecting and feeding the material to be threshed to the threshing elements and for cleaning the separated seed and delivering the seed and the roughage from the machine at different points.

Apparatus commonly employed prior to my invention for separating seed of various kinds from the plant upon which it was grown embodied a rotating cylinder and a cooperating concave between which and the cylinder the material to be threshed was fed. Both cylinder and concave were provided with teeth or other projections which separated the grain from the stalk by a flailing or striking action. The intermeshing of the opposed teeth, however, produced a grinding action which often injured the seed. Machines operating upon the flailing, striking and grinding principle are quite unsuitable for separating many types of seed from the plant, such, for instance, as beans and peas, either ripe or green unless the parts are run very slowly. If the machine is operated at sufficient speed for use in a harvesting machine the seeds of such plants as these are split, broken and disfigured.

One of the primary purposes of my present invention is to provide an apparatus which will be gentle, though effective, in its action, thereby enabling it to be employed in the threshing of various materials, including green peas and beans, without injury to the separated seeds or berries. With this end in view, my invention contemplates the provision of a pair of cooperating threshing elements at least one of which is substantially flat or plate-like in contour, between which the material to be threshed is fed. The elements are so mounted and connected up that relative vibratory movement between them may be produced, which movement may be a straight relative longitudinal movement but which preferably is a relative movement both longitudinally and toward and from each other, so that the action upon the interposed material is a combination of impact and attrition, which effectively separates the seeds from the plant stalk without injury to the seed.

Another feature of my invention resides in the mounting of the vining elements so that a sharp vibratory motion is imparted to at least one of the elements, and in addition one at least of the elements is adjustably biased toward the other, so as to insure sufficient regulated pressure upon the material to enable the elements to cause the separation of substantially all of the seeds from the roughage without substantial damage thereto and at a relatively rapid rate.

Another purpose of my invention is to provide improved means for collecting and delivering to the threshing elements the material to be threshed, and for cleaning and collecting the threshed seeds.

An important object of the invention is the provision of a harvesting machine for separating green peas, beans and the like from vines in the field and delivering the grain and the vines to separate points for accumulation.

Another object is the provision of a harvesting machine capable of removing green peas, beans and the like from the vines at a rate of speed such that the grain may be separated in the field. I have also aimed to provide a harvesting machine for green peas, beans and other vine crops having means for cutting the vines, separating the grain from the vines and delivering the grain and vines to separate accumulation points as the machine is driven through the field.

While my improved threshing elements per se may be embodied in machines of either the stationary or portable type, they are particularly suitable, because of their efficient operation, for use in portable machines of the type commonly referred to in the trade as combines, and it is this type of machine I have chosen for here illustrating the principles of my invention.

While the machine herein shown and described is designed primarily for the harvesting of green crops such as peas and the like, such as harvested in large quantities for canning purposes, it is also suitable with modifications for use with other small grains.

The size of the corrugations or other form of surface roughening with which my improved threshing elements are provided, and also the size of the perforations through which the separated seeds drop from the threshing zone will, of course, be varied to some extent in accordance with the character of the material being threshed. For instance, in the threshing of wheat, the corrugations and the openings in the lower threshing element will both be smaller for efficient results than would be suitable for the threshing or, as it is usually called, the vining of green peas. The principle of operation, however, is the same irrespective of the type of seed to be separated from the plant, and therefore, the terms "seed" and "roughages" are herein employed in a generic sense to designate a wide variety of seeds ranging between hard wheat and peas or beans, and a similar variety of plant stalks ranging between wheat straw and pea or bean vines. Likewise different speeds of the screens are required for different crops and for different conditions in the same crops and consequently suitable mechanism is provided to accomplish these various speeds.

In order to facilitate an understanding of the principles of my invention, I have illustrated on the accompanying drawings preferred embodiments thereof, the structural details illustrated, however, being capable of considerable modification and variation without departing from the spirit of my invention.

Referring to the drawings,

Fig. 5 is a fragmentary elevation looking toward the left at Fig. 3;

Fig. 6 is a sectional detail on the lines 6—6 of Fig. 1 showing on a larger scale than in Fig. 1, the auger and a portion of the elevator;

Fig. 7 is an enlarged fragmentary plan view of one of the lower threshing elements;

Fig. 8 is a sectional view through the fragment of Fig. 7 extending longitudinally of the threshing element;

Fig. 9 is a fragmentary side elevation showing a portion of the side opposite Fig. 5 on a slightly smaller scale;

Fig. 10 is a fragmentary plan view similar to Fig. 2 but on a larger scale, illustrating a modification of my invention;

Fig. 11 is a sectional view partially in elevation of the modification shown in Fig. 10; and Fig. 12 is an enlarged view of the means for supporting the upper threshing element of the form shown in Figs. 10 and 11.

Figure 1:
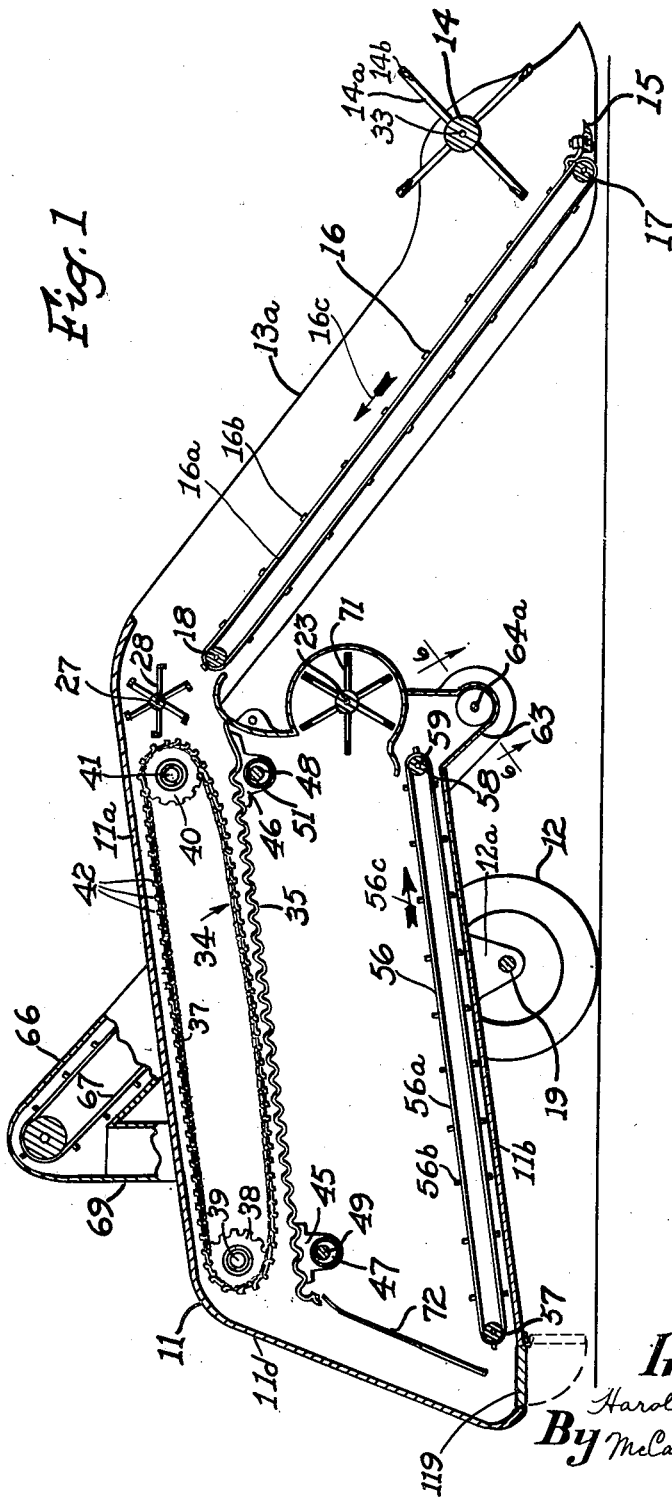
Fig. 1 is a longitudinal sectional view, somewhat schematic, of a harvesting machine embodying the principles of my invention.
Figure 2:
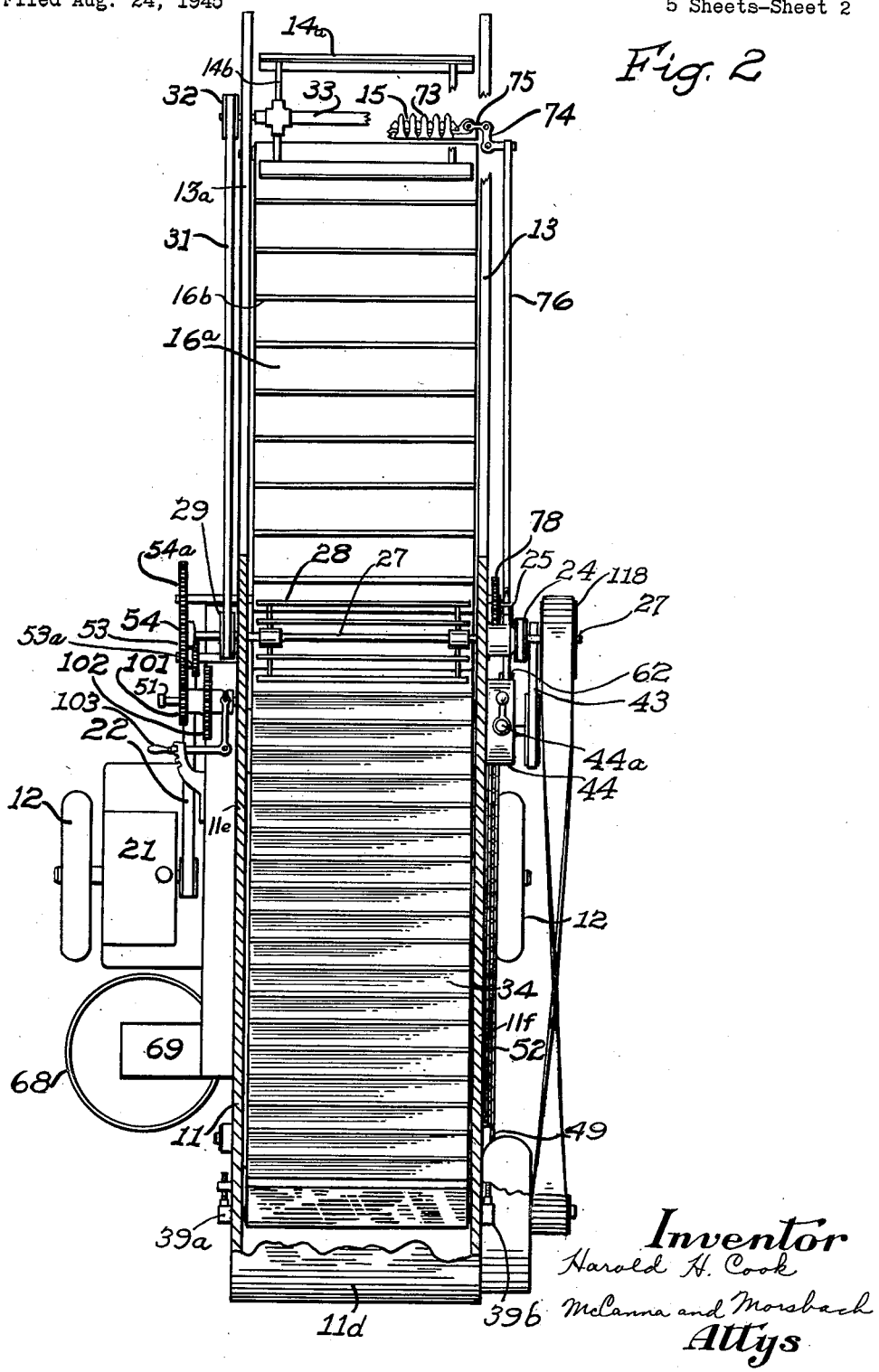
Fig. 2 is a plan view of the machine shown in Fig. 1 with the top of the casing removed to disclose the underlying parts.

The machine illustrated comprises a metal casing 11 having a top wall 11a, a bottom wall 11b, a front end wall 11c, a rear end wall 11d, and side walls 11e and 11f. The casing 11 constitutes the frame of the machine and is supported upon a pair of wheels 12 by means of brackets 12a and is adapted to be towed in the usual way by a tractor by means of a conventional tractor hitch not shown. At the forward end of the casing is a device for bringing the material to be acted upon from the field into the casing. Such devices are well known in the art of binders and harvester-threshers, and I have herein shown by way of illustration a pair of laterally spaced downwardly and forwardly projecting side members 13 and 13a integral with the casing. Extending between the side members 13 and 13a is a sickle 15, presently to be more fully described, by which the material being harvested is cut. A reel 14, comprising a central shaft 33, spiders 14a and annularly spaced slats 14b, extends between the side members 13 and 13a and is rotatable thereon in position to engage the tops of the material being harvested and tilt the same back onto an elevator apron 16. The elevator apron 16 comprises an endless belt 16a commonly of canvas having a width substantially equal to the distance between the side members 13 and 13a provided with spaced slats 16b commonly of wood, the belt being trained over a roll 17 disposed behind and adjacent to the sickle 15 and journaled in a conventional way as by bearings in the side members 13 and 13a, and also trained over a roll 18 mounted for rotation at its ends in the side members 13 and 13a adjacent the upper end thereof. The conveyer runs in the direction indicated by the arrow 16c.

Figure 3:
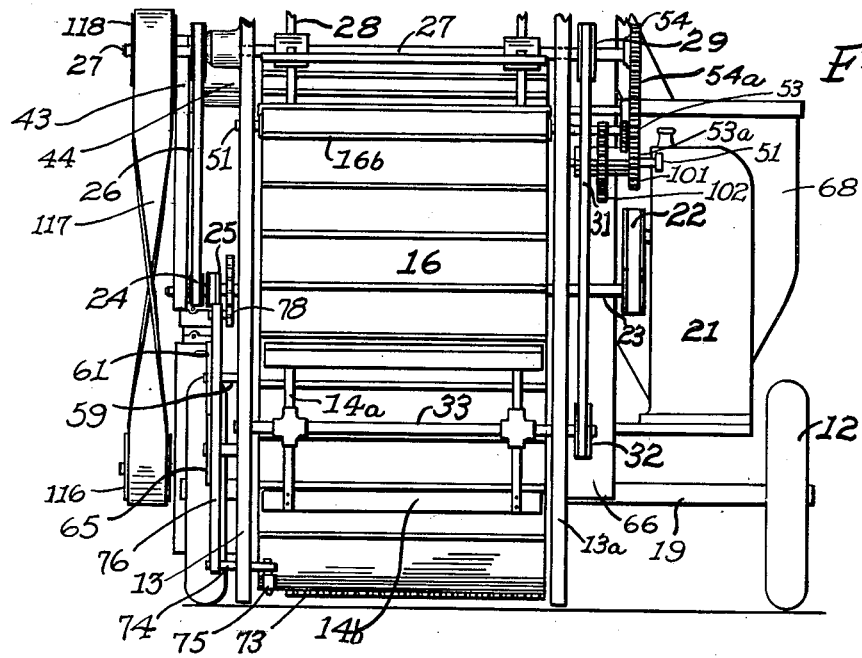
Fig. 3 is a front elevation of the machine looking toward the left at Figs. 1 and 2.

While any of the well known means for driving the machine may be employed, I prefer in most instances to equip the machine with a prime mover, such as a gas engine indicated generally by reference character 21. The power from the engine is delivered through a belt 22 to a countershaft 23, (Fig. 3) extending transversely of the machine and provided at the opposite side of the machine with a plurality of pulleys 24 and 25 and 43a. A belt 26 driven from the pulley 24 drives a shaft 27 extending transversely of the casing or housing at the upper end of the chute, which carries a reel or feeder 28 adapted to loosen up and direct into the space between the elements to be later described, the material which has been gathered and delivered at the upper end of the elevating conveyor 16. The opposite end of the shaft 27 is equipped with a pulley 29 over which is trained a belt 31 having also driving relation with a pulley 32 on the supporting and driving shaft 33 of the gathering reel 14. In this manner the reels 14 and 28 are driven in timed relation so as to lay the cut material back upon the elevating apron 16 behind the reel 14 and to fluff up and direct downwardly and rearwardly between the threshing elements the same material as it is discharged at the upper end of the elevating conveyor.

The vining is performed by one or more pairs of relatively movable elements best illustrated in Figs. 1, 2, 7 and 8 of the drawings. From Fig. 1 it will be observed that the lower element indicated generally by reference character 35 is substantially flat or plate-like in general contour, but corrugated transversely to provide opposed corrugated surfaces by which the threshing function is performed. While I have found that corrugations are preferable on the working faces of these elements, it should be understood that the surfaces may be otherwise fluted or roughened without being actually corrugated.

The upper element 34 comprises an endless belt having chains 37 disposed on opposite edges thereof trained over sprockets 38 attached to a shaft 39 and sprockets 40 attached to a drive shaft 41. The belt is provided with transversely extending slats 42 spaced therealong to engage the material disposed between the belt and the element 35. Screws 39a and 39b (Fig. 2) on the sides of the housing serve to adjust the position of the shaft 39 and consequently the tension on the belt 34, thus adjusting the distance between the lower reach of the belt and the element 35 and thereby adjusting the pressure on the material disposed on the element 35. By moving the shaft 39 to allow more slack in the belt a greater portion of the weight of the belt bears against the material thereby increasing the violence of the vining operation. This arrangement also permits the device to be adjusted to care for a greater or lesser volume of material coming up the conveyor 16 due to differences in the speed of the machine through the field or differences in the density of the crop growth.

The shaft 41 is driven from the counter shaft 23 by means of a flat belt 43 trained over a pulley 43a on the shaft 23 and over a pulley 43b on a conventional change speed transmission designated generally by the numeral 44 having a lever 44a for adjusting the speed. The transmission, which may be of any conventional design, is connected to and drives the shaft 41 at any of a plurality of speeds so as to adjust the speed of the upper element 34. By crossing the belt 43 the upper element may also be driven in opposite directions from which it will be seen that both the speed and the direction of the upper elements may be controlled.

The lower threshing element 35 is supported at its two rear corners by bearing blocks 45 and at its two forward corners by bearing blocks 46 each of which are fixed to the element 35. Each of the bearing blocks 45 receives an eccentric cam 47 fixed to a shaft 49 and rotatable in the bearing blocks so that rotation of the shaft rotates the cams and imparts a vibratory motion to blocks and threshing element. Likewise each of the bearing blocks 46 rotatably receives an eccentric cam 48 fixed on a shaft 51. The cams 47 and 48 are, of course, arranged on the shafts 49 and 51 to operate synchronously and the shafts are connected to run in synchronism by a chain 52 (Fig. 4) trained over sprockets 51a fixed on the shafts 49 and 51.

The shaft 51 is driven from the shaft 27 through a selective speed transmission so that the speed of reciprocation of the lower element may be adjusted to suit the type of condition of the material. This transmission may be of conventional design, that herein shown for purpose of illustration comprising a gear 54 attached to the shaft 27, an idle gear 54a driving a second idle gear 53 which in turn carries a spur gear 53a. The shaft 51 carries a slider on which are disposed gears 101 and 102 adapted to selectively mesh with gears 53 and 53a to drive the shaft 51 at different speeds. The slider is moved by a handle 103 to change the speed of the drive.

It will be manifest that a rotary movement of the shafts 49 and 51 in a counter-clockwise direction viewing Fig. 1 will produce a rapid vibratory movement of the element 35. In many instances this sharp vibratory movement is sufficient to accomplish the separation of the seeds from the roughage with little or no pressure from the upper element and the inclined position of the lower element coupled with the vibratory movement of the element moves the material along the element toward the rear of the machine. However, this movement is a compound movement consisting of motion toward and from the element 34 and at the same time a longitudinal movement relatively to the element 34. This compound movement in conjunction with the roughened opposed faces of the threshing elements results in successive impacts upon the material being threshed as the element 35 moves toward the element 34 and an action of attrition or rubbing as a consequence of the relative longitudinal movement between the elements. By the successive actions of impact and attrition as the material is fed through between the threshing elements by the movement of the element 35 and when properly adjusted the seeds are effectively but gently separated from the roughage, whether the material being threshed is of a dry or green character, without splitting, breaking or otherwise injuring the seed and without breaking or tearing the vines into shreds. This gentle handling of the material in removing the seeds from the roughage leaves both the grain and the roughage unimpaired and in suitable condition for subsequent use.

Figure 4:
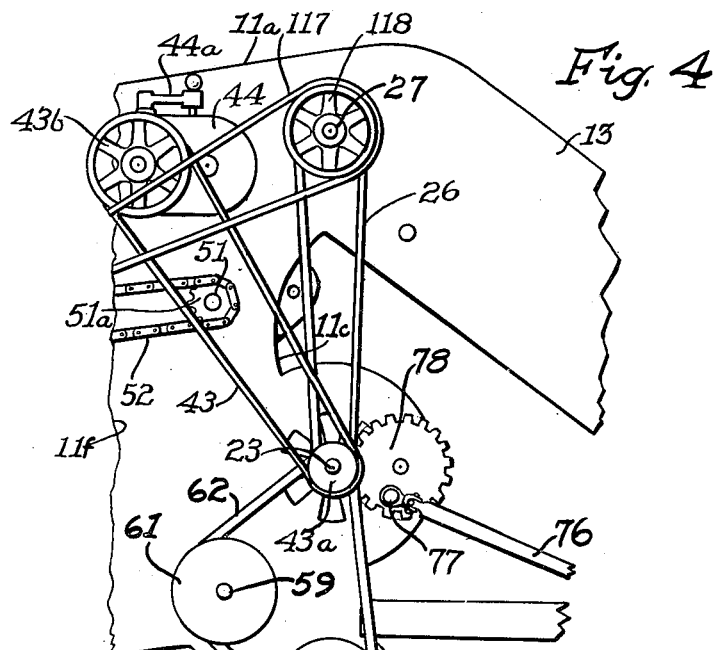
Fig. 4 is a fragmentary side elevation looking toward the right at Fig. 3 and on a larger scale.

The separated grain or seed of whatever character drops through the openings 55 in the foraminous element 35 (Figs. 7 and 8) and falls upon an endless apron conveyor 56 mounted beneath the threshing elements upon rollers 57 and 58. The apron conveyor 56 comprises an endless belt or apron 56a of substantially the width of the casing 11 commonly formed of canvas and having slats 56b commonly of wood disposed thereacross in spaced relation, as is well known in the art. The conveyer travels in the direction indicated by arrow 56c. The shaft 59 upon which the roller 58 is mounted is provided outside the housing of the machine with a pulley 61 adapted to be driven by a belt 62 from the pulley 25 on counter-shaft 23, (Fig. 4). The apron conveyor travels in the direction of the arrow of Fig. 1, thus conveying the separated seeds toward the front of the machine where they are discharged by the conveyor into a trough 63 extending transversely of the machine and in which is located a worm conveyor 64 also driven by the belt 62 through a pulley 65 mounted upon the shaft 64a of the worm conveyor. The seed is thus conveyed across the machine to the lower end of a chute 66 in which is mounted a belt type elevator 67, comprising an endless belt 67a of substantially the width of the chute 66 commonly formed of canvas and having slats 67b commonly of wood disposed thereacross in spaced relation, as is well known in the art, (Figs. 1 and 6) driven from the shaft of the screw conveyor and adapted to elevate the seeds to a point above a hopper 68 into which it is discharged through a vertical conduit 69. From the hopper the peas are periodically discharged into the usual boxes for transportation to the cannery.

As the separated seeds fall from the element 35 onto the conveyor 56, they are cleaned of the accompanying dirt and chaff by an air blast delivered by a fan 71 (Fig. 1), mounted on the counter-shaft 23. The chaff and dirt thus separated are discharged at the rear of the machine beyond the rear end of the conveyor 56, and the roughage from the threshing elements is likewise delivered at this point, a partition 72 being provided to prevent the roughage from falling upon the conveyor 56.

The sickle 15 is reciprocated between the guards 73 (Fig. 2) by conventional means as by a bell crank 74 connected by a link 75 with the sickle and connected by a pitman or rod 76 with a wrist pin 77 (Fig. 4) projecting from the face of a gear wheel 78 which is driven by a pinion 79 on the counter-shaft 23.

The roughage moving off the rear end of the lower element 35 passes down between the rear end of the housing and the partition 72 to a combination cutter and blower 105 (Fig. 9). This cutter and blower may be of conventional design and in this instance comprises a housing 106 carried on the casing 11 and having communication with the space between the casing and the partition 72 through an opening 107. At the lower edge of the opening 107 is a shear bar 108 cooperable with a plurality of cutter blades 109 annularly spaced on a fly-wheel 111, which in turn is carried on a shaft 112 journaled in the walls of the housing. The fly-wheel 111 also carries spaced fan wings 113 for moving air and roughage in through an opening 107 and discharging the same through a discharge pipe 114 connected to the periphery of the housing and having an adjustable delivery pipe 115 attached thereto to deliver the roughage to a vehicle accompanying the harvesting machine. As the vines and similar roughage pass down across the partition 72, they are drawn through the opening 107 and cut into relatively small pieces by action of the blades 109 against the shear plate 108, the fan wings lifting the material and driving it out through the pipe 115. The flywheel 111 is driven from a pulley 116 on the shaft 112 over which is trained a belt 117 which passes over a pulley 118 (Fig. 2) on the shaft 27.

With the construction as described above, the green vines or other roughage are cut into small lengths suitable for silage. However, in many instances it is desirable to harvest the roughage in the form of hay or to spread the roughage over the ground to be plowed under as fertilizer. The construction is, therefore, so arranged that this may be done at the option of the operator. Positioned in the bottom of the casing 11, below the partition 72, is a door 119 which extends substantially across the housing and is arranged to be latched in closed position as shown in full lines in Fig. 1 when the roughage is to be delivered to the cutter and blower. When the roughage is to be employed for hay, the door 119 is opened and allowed to hang in suspended position, as shown in dotted lines. Simultaneously the belt is removed from the pulleys 116 and 118 so that the blower remains idle. Under these circumstances the roughage passes down along the partition 72 and is delivered through the door 119 onto the ground. Since at no time in the passage of the roughage through the machine is it concentrated, it passes out onto the ground in spread-out condition where it may be reached by the sun and air for drying and may subsequently be raked up and handled like any other hay crop.

In the form of the invention disclosed in Figs. 10 and 11, the various mechanisms are substantially identical with those described above with the exception of the upper threshing element and bear corresponding reference numbers. The upper element, in this instance, comprises a corrugated plate 87 generally similar to the plate 35 with the exception that the holes 55 of the latter are not provided. For the purpose of supporting the plate, cross bars 80 are disposed between the sides of the casing 11 and carry adjacent their ends horizontally extending fingers 83 and 84. Adjacent each finger the plate 87 has U-shaped supporting brackets as shown at 85 and 86, the fingers extending through slots 90 (Fig. 12) in the legs of these brackets. Disposed between the legs of the brackets are slide blocks, as shown at 81 and 82, free to slide longitudinally with respect to the legs of the bracket and having snug fitting holes 90a through which the fingers pass. The blocks 81 and 82 carry upstanding pins 91a passing through openings in the center portion of the brackets, the pins being threaded at their upper ends for reception of nuts 91 adapted to be adjusted on the rods to adjust the compression on coil springs 88 and 89 encircling the pins and bearing against the upper sides of the brackets. Thus, by adjusting the position of the nuts 91, more or less of the weight of the plate 87 may be removed from the material passing between the two elements so as to regulate the severity of the threshing action.

For producing reciprocatory motion of the element 87 a piston and cylinder, designated generally by reference character 93, and an adjustable valve mechanism 94 of usual construction for adjusting the speed of operation of the piston is mounted upon a cross bar 92. The piston is connected to the plate 87 by a pivotal link 96 and a bracket 96a so that upon reciprocation of the piston, the plate 87 is reciprocated in a longitudinal direction. An air compressor 97 is mounted on the casing and connected to the valve mechanism 94 by a conduit 95, the air compressor being driven from any suitable source of power as, for example, by a belt trained over a pulley 99 mounted on the shaft 23.

In this form of my invention it will be apparent that the action of the vibratory element 35 upon the material being threshed is augmented by the reciprocatory action of the cooperating threshing element 87. In this manner the violence of the threshing action may be adjusted to suit the materials and the conditions. For some types of material the reciprocation of the upper threshing element in addition to the vibratory movement of the lower element may not be necessary, and where the material to be threshed is of such a character the upper element 87 may be allowed to remain stationary by adjusting the valve mechanism 94a or by removing the belt from the pulley 99. Likewise, if desired, the threshing element 35 may be driven pneumatically by mechanism similar to that described for driving the element 87.

While I have shown and described those forms of my invention which at present seem preferable, it should be appreciated that the structural details shown for illustrative purposes may be modified within wide limits without departing from the scope of my invention as defined in the following claims.

I claim:

1. The combination in a threshing mechanism of a substantially flat foraminous threshing member extending substantially the entire length of the threshing chamber and provided with transversely formed corrugations on its upper surface, means for delivering material to be threshed onto one end of said member, means substantially coextensive lengthwise with said member and superimposed thereover for yieldingly holding said material in position to be operated upon by said member, and means for actuating said member to cause the same to move with a composite bodily gyratory motion in a direction toward and away from and lengthwise of said holding means to separate the seeds from the roughage through gyratory action.

2. Apparatus as recited in claim 1, wherein said holding means comprises an endless belt movable lengthwise of the threshing chamber with its lower reach in spaced face to face relation with the upper surface on the foraminous member.

3. Apparatus as recited in claim 2, further characterized by means for adjusting the tension of the belt to adjust the pressure applied to the material between the foraminous threshing member and the belt.

4. Apparatus as recited in claim 1, further characterized by means for driving the belt in either of two opposite directions lengthwise of the threshing member at any of a plurality of speeds to control the rate of passage of the material between the foraminous threshing member and the belt.

5. Apparatus as recited in claim 1, wherein the holding means comprises a substantially flat member formed with corrugations on its lower surface, said corrugated holding member being reciprocable lengthwise of the threshing chamber.

6. The combination in a threshing machine of a substantially flat foraminous threshing member extending a substantial portion of the length of the threshing area in the machine and provided with transversely formed corrugations on its upper surface, means extending a substantial portion of the length of said member and superimposed thereover for yieldingly holding said material in position to be operated upon by said member, and means for actuating said member to cause the same to move with a composite bodily gyratory motion in a direction toward and away from and lengthwise of said holding means to separate the seeds from the roughage through gyratory action.

7. The combination in a threshing mechanism of a substantially flat foraminous threshing member extending a substantial portion of the length of the threshing area in the mechanism and provided with transversely formed corrugations on its upper surface, means extending a substantial portion of the length of said member and superimposed thereover for yieldingly holding said material in position to be operated upon by said member, and means for actuating said member to cause the same to move with a gyratory motion in a direction toward and away from and lengthwise of said holding means to separate the seeds from the roughage through gyratory action.

8. The combination in a threshing mechanism of a substantially flat foraminous threshing member extending substantially the entire length of the threshing chamber and provided with transversely formed corrugations on its upper surface, means for delivering material to be threshed onto the upper surface on said member, means substantially coextensive lengthwise with said member and superimposed thereover for yieldingly holding said material in position to be operated upon by said member, and means for actuating said member to cause the same to move with a gyratory motion in a direction toward and away from and lengthwise of said holding means to separate the seeds from the roughage through gyratory action.

9. The combination in a threshing mechanism of a substantially flat foraminous threshing member extending a substantial portion of the length of the threshing chamber and provided with transversely formed corrugations on its upper surface, means for delivering material to be threshed onto the upper surface on said member, means coextensive lengthwise a substantial portion of said member and superimposed thereover for yieldingly holding said material in position to be operated upon by said member, and means for actuating said member to cause the same to move with a composite bodily gyratory motion in a direction toward and away from and lengthwise of said holding means to separate the seeds from the roughage through gyratory action.

10. The combination in a threshing mechanism of a substantially flat threshing member extending a substantial portion of the length of the threshing member and provided with transversely formed corrugations on its upper surface, means extending lengthwise with said member a substantial portion of the length thereof and superimposed thereover for yieldingly holding said material in position to be operated upon by said member, and means for actuating said member to cause the same to move with a gyratory motion with respect to said holding means to separate the seeds from the roughage through gyratory action.

11. The combination in a threshing mechanism of a substantially flat foraminous threshing member extending a substantial portion of the length of the threshing chamber and formed with transverse corrugations on its upper surface, means in the threshing chamber movable lengthwise of said member and superimposed thereover for yieldingly holding said material in position to be operated upon by said member, and means for actuating said member to cause the same to move with a bodily gyratory motion with respect to said holding means to separate the seeds from the roughage through gyratory action.

HAROLD H. COOK.

REFERENCES CITED

The following references are of record in the file of this patent:

UNITED STATES PATENTS

| Number | Name | Date |
| --- | --- | --- |
| 126,683 | Custer | May 14, 1872 |
| 142,672 | Breese | Sept. 9, 1873 |
| 383,062 | Lucas | May 15, 1888 |
| 502,473 | Springer | Aug. 1, 1893 |
| 613,082 | Sellers | Oct. 25, 1898 |
| 632,271 | Martel | Sept. 5, 1899 |
| 675,221 | Jorgensen | May 28, 1901 |
| 740,949 | Traeger | Oct. 6, 1903 |
| 744,696 | Silvis et al. | Nov. 17, 1903 |
| 776,674 | Noldner | Dec. 6, 1904 |
| 830,337 | Landis | Sept. 4, 1906 |
| 865,445 | Steel et al. | Sept. 10, 1907 |
| 1,042,859 | Whitmore | Oct. 29, 1912 |
| 1,107,965 | Klinghammer | Aug. 18, 1914 |
| 1,257,592 | Ek | Feb. 26, 1918 |
| 1,307,322 | St. Clair | June 17, 1919 |
| 1,415,191 | Parks et al. | May 9, 1922 |
| 1,513,834 | Loftness | Nov. 4, 1924 |
| 1,644,537 | Meacham | Oct. 4, 1927 |
| 1,750,546 | Synck | Mar. 11, 1930 |
| 2,037,300 | Arbuckle | Apr. 14, 1936 |
| 2,064,689 | Russwurm et al. | Dec. 15, 1936 |
| 2,190,262 | Geist | Feb. 13, 1940 |
| 2,253,794 | Lindholm | Aug. 26, 1941 |
| 2,340,457 | Dion | Feb. 1, 1944 |

FOREIGN PATENTS

| Number | Country | Date |
| --- | --- | --- |
| 18,936 | Great Britain | Oct. 9, 1893 |